US008251643B2

(12) United States Patent
Zheng et al.

(10) Patent No.: US 8,251,643 B2
(45) Date of Patent: Aug. 28, 2012

(54) STEAM TURBINE HAVING ROTOR WITH CAVITIES

(75) Inventors: Xiaoqing Zheng, Niskayuna, NY (US); Michael John Bowman, Niskayuna, NY (US); Roy Paul Swintek, Altamont, NY (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 12/565,145

(22) Filed: Sep. 23, 2009

(65) Prior Publication Data

US 2011/0070069 A1 Mar. 24, 2011

(51) Int. Cl.

| | |
|---|---|
| ***F01D 5/14*** | (2006.01) |
| ***F03D 11/00*** | (2006.01) |
| ***F04D 29/38*** | (2006.01) |
| ***F04D 31/00*** | (2006.01) |
| ***F04D 29/00*** | (2006.01) |

(52) U.S. Cl. ........................ 415/115; 415/116; 415/230

(58) Field of Classification Search .................. 415/115, 415/116, 199.5, 216.1, 230, 174.5

See application file for complete search history.

(56) References Cited

U.S. PATENT DOCUMENTS

| | | | | |
|---|---|---|---|---|
| 3,443,790 | A * | 5/1969 | Buckland | 415/115 |
| 4,293,777 | A * | 10/1981 | Gamell | 290/52 |
| 5,628,623 | A * | 5/1997 | Skaggs | 417/151 |
| 6,010,302 | A * | 1/2000 | Oeynhausen | 415/115 |
| 6,227,799 | B1 * | 5/2001 | Kuhn et al. | 415/115 |
| 7,267,525 | B2 * | 9/2007 | Hiegemann et al. | 415/115 |
| 2003/0102630 | A1 * | 6/2003 | Dinc et al. | 277/355 |
| 2009/0196735 | A1 * | 8/2009 | Bracken et al. | 415/101 |

* cited by examiner

*Primary Examiner* — Edward Look
*Assistant Examiner* — Su Htay
(74) *Attorney, Agent, or Firm* — Ernest G. Cusick; Hoffman Warnick LLC

(57) ABSTRACT

A steam turbine and a rotor are disclosed having steam extending internally along at least part of the rotor. The rotor includes an interface and a steam passage system formed in the rotor, the passage system including a first inlet flow passage to the interface, the first inlet flow passage configured to receive steam from a first region of an outer surface of the rotor, a first outlet flow passage from the interface, the first outlet flow passage configured to pass steam to a second region of the rotor, a second inlet flow passage to the interface, the second inlet flow passage configured to receive steam from a third region of the outer surface of the rotor, a second outlet flow passage from the interface, the second outlet flow passage configured to pass steam to a fourth region of the rotor.

20 Claims, 4 Drawing Sheets

STEAM TURBINE HAVING ROTOR WITH CAVITIES

BACKGROUND OF THE INVENTION

The subject matter disclosed herein relates generally to steam turbines and rotors and more specifically to the circulation and cooling of steam turbine rotors using internal flow passages.

BRIEF DESCRIPTION OF THE INVENTION

A steam turbine and a rotor are disclosed having steam extending internally along at least part of the rotor. The rotor includes an interface and a steam passage system formed in the rotor, the passage system including a first inlet flow passage to the interface, the first inlet flow passage configured to receive steam from a first region of an outer surface of the rotor, a first outlet flow passage from the interface, the first outlet flow passage configured to pass steam to a second region of the rotor, a second inlet flow passage to the interface, the second inlet flow passage configured to receive steam from a third region of the outer surface of the rotor, a second outlet flow passage from the interface, the second outlet flow passage configured to pass steam to a fourth region of the rotor.

A first aspect of the invention provides a steam turbine having a rotor, steam extending internally along at least part of the rotor, the rotor comprising a first rotor section having a first axial end face with a first flow passage and a separate second flow passage, a second rotor section having a second axial end face with a first flow passage and a separate second flow passage, the second rotor section disposed axially adjacent and circumferentially rotated to the first rotor section so that the second axial end face faces the first axial end face so that each of the first flow passages in the two rotor sections line up to make a continuous passage and each of the second flow passages in the two rotor sections line up to make a continuous passage and a passage system formed in the rotor and including a first inlet flow passage to an interface, the first inlet flow passage configured to receive steam from a first region of an outer surface of the rotor, a first outlet flow passage from the interface, the first outlet flow passage configured to pass steam to a second region of the rotor, a second inlet flow passage to the interface, the second inlet flow passage configured to receive steam from a third region of the outer surface of the rotor, and a second outlet flow passage from the interface, the second outlet flow passage configured to pass steam to a fourth region of the rotor.

A second aspect of the invention provides a rotor having steam extending internally along at least part of the rotor, the rotor comprising a first rotor section having a first axial end face with a first flow passage and a separate second flow passage, a second rotor section having a second axial end face with a first flow passage and a separate second flow passage, the second rotor section disposed axially adjacent and circumferentially rotated to the first rotor section so that the second axial end face faces the first axial end face so that each of the first flow passages in the two rotor sections line up to make a continuous passage and each of the second flow passages in the two rotor sections line up to make a continuous passage and a passage system formed in the rotor and including a first inlet flow passage to an interface, the first inlet flow passage configured to receive steam from a first region of an outer surface of the rotor, a first outlet flow passage from the interface, the first outlet flow passage configured to pass steam to a second region of the rotor, a second inlet flow passage to the interface, the second inlet flow passage configured to receive steam from a third region of the outer surface of the rotor, and a second outlet flow passage from the interface, the second outlet flow passage configured to pass steam to a fourth region of the rotor.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
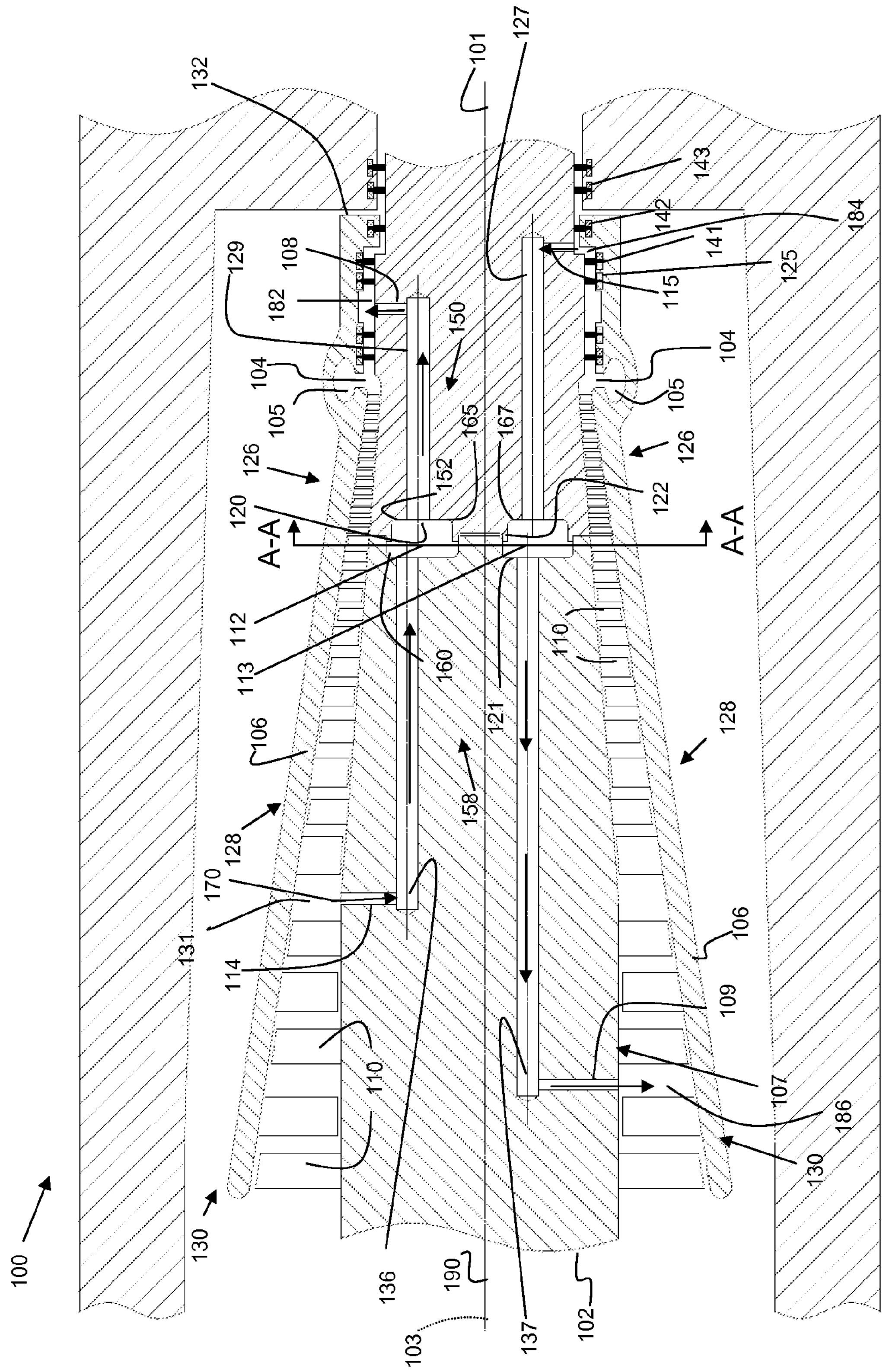
FIG. 1 shows a longitudinal section of a steam turbine including the circulation of steam in passages within one steam turbine section. The longitudinal section is cut along line B-B in FIG. 3.

Steam turbine operating temperature has a significant impact on turbine performance, but is limited to the capability of material used to construct the turbine. Effective cooling of steam turbine can improve thermal capability of rotor material and allow for higher steam temperature to achieve greater steam turbine and/or steam plant efficiency. Another factor that has a significant impact on turbine efficiency is the endpacking leakage near the turbine and rotor ends. Through regulating pressure drop across seals, a tighter seal with limited pressure capability can be used.

As discussed below, one embodiment of the invention is to connect different sealing zones in the endpacking region to different stages in the main flow path of the steam turbine. Since turbine stages have well-defined pressures, through these connections, the endpacking region is divided into zones with well-defined pressure drop. Moreover, in an alternative embodiment, brush seals can be used to reduce steam leakage (i.e., energy loss) and improve turbine efficiency if the pressure difference within each zone is less than the pressure capability of the brush seal. With the pressure loading regulated by stage pressure, the brush seals will not be overloaded even though the total pressure drop in the endpacking region exceeds the pressure limit of multiple brush seals. Another benefit is that the steam flow through the rotor passages will simultaneously cool the hot region of the rotor.

It is beneficial to divide the endpacking region of the steam turbine into different pressure zones and to maintain a constant pressure loading within each pressure zone. One embodiment described herein is to use brush seals to divide the endpacking region into different zones. A brush seal is a very effective sealing device, but it has limited pressure drop capability. However, if multiple brush seals are arranged in series to withstand a large pressure drop, the compressible nature of steam will create an uneven loading among the brush seals. As a result, the last seal in the series is over-loaded and may be damaged. Consequently, the second to the last seal may become over-loaded and may also be damaged. Sequentially, one-by-one, all of the brush seals, may become damaged. As a result, the turbine will suffer efficiency degradation due to leakage increases. A regulated constant steam pressure drop over seal packing rings will maximize usage of brush seals and avoid over-loading by non-linear pressure distribution. Such a zonal sealing approach increases the performance of the steam turbine and reduces the need and frequency for maintenance and other repairs. Moreover, it provides for the advantageous situation of being able to cool the rotor of the steam turbine. The ability to cool the rotor allows the steam turbine to operate at higher temperatures without reducing component-parts operating longevity (such as via the creep mechanism). Operating the steam turbine at higher temperatures allows for increased efficiencies.

Turning to FIG. 1, a steam turbine 100 may have two or more passages at the interface of two rotor sections in the rotor 102. The configuration of each rotor section at the interface may be built into rotor 102 or they may be formed after construction of steam turbine 100. Steam turbine 100 may be comprised of rotor 102 including: a first rotor section 150 having a first axial end face 152 with a first flow passage 112 and a separate second flow passage 113; a second rotor section 158 having a second axial end face 160 with a first flow passage 112 and a separate second flow passage 113, second rotor section 158 disposed axially adjacent and circumferentially rotated to first rotor section 150 so that the second axial end face 160 faces the first axial end face 152 so that each of the first flow passages 112 in the two rotor sections 150/158 line up to make a continuous passage 129/136 and each of the second flow passages 113 in the two rotor sections 150/158 line up to make a continuous passage 127/137.

Steam turbine 100 may also include a passage system 300 (FIG. 3) formed in rotor 102, passage system 300 including: a first inlet flow passage 114 to an interface 165 (FIG. 1), first inlet flow passage 114 configured to receive steam from a first region of an outer surface of the rotor 131; a first outlet flow passage 108 from interface 165, first outlet flow passage 108 configured to pass steam to a second region of the rotor 182; a second inlet flow passage 115 to second interface 167, second inlet flow passage 115 configured to receive steam from a third region of the outer surface of the rotor 184, and a second outlet flow passage 109 from second interface 167, second outlet flow passage 109 configured to pass steam to a fourth region of the rotor 186. In one embodiment, first outlet 108 and second inlet 115 flow passages are in a region of rotor 102 that is devoid of any blades 110.

The coupling of first axial end face 152 and second axial end face 160 may be by welding and/or by mechanical coupling. Additionally, the first 112 and second flow passages 113 may be partitioned. As an illustrative example, at least one of the first 112 and second flow passages 113 may include a radially extending wall 121 (FIG. 3) or a mechanical seal 122 (FIG. 5) for partitioning the first 112 and second flow passages 113 into smaller passages. These passages may be used for multiple purposes. As explained in greater detail below, a passage may be used to transport steam from one region (e.g., 150, 158) of high pressure ("HP") turbine 100 to another region of HP turbine or to an intermediate pressure ("IP") turbine 200 (FIG. 2) or to a low pressure turbine ("LP"). In one embodiment, steam may be moved throughout rotor 102 to regulate pressure in endpacking region 182 and serve as a leak-off line to route leakage back into turbine flow path to produce additional rotor torque and power. Additionally, the movement of steam may be used to cool rotor 102 by tunneling cooler steam through the high-temperature region near inlet manifold 105. Moreover, steam may be moved from one steam turbine 100 to a second steam turbine rotor 202 (FIG. 2) to avoid expensive external piping. There may also be two or more passages 129/136 within rotor 102 of steam turbine 100 and each passage may have a different pressure. Further, passages 129/136 and first 112 and second flow passages 113 may be used to transport cables or wires. The cables or wires may be used for the operation, monitoring, and/or control of steam turbine 100 or 200. A passage that is used to transport steam may also be used to transport a cable or wire 204.

As an example of the movement of steam from one region (e.g., 150, 158) of steam turbine 100 to another region, there may be regions of steam turbine 100 with different pressures. In one embodiment, first 150 and second rotor sections 158 may be in the same pressure section of steam turbine 100. In an alternative embodiment, first 150 and second rotor sections 158 may extend between different pressure sections of steam turbine system such as "HP" and "IP". In a further embodiment, first flow passage 112, first inlet flow passage 114 and first outlet flow passage 108 is at a first pressure and each of the second flow passage 113, second inlet flow passage 115 and second outlet flow passage 109 is at a second pressure that is different from the first pressure.

As an example, the pressure at earlier stages is higher than the later stage (e.g., from right to left in FIG. 1). After the steam expands through earlier stages, the steam temperature will be significantly lower than the inlet temperature at inlet manifold 105. Since the pressure at stage space 131 is higher than the pressure at later stage 186, the steam at stage space 131 will enter first inlet flow passage 114 and flow toward intermediate pressure region 182 through passage 136/129 while cooling rotor 102 as it passes by the high temperature inlet region 104. The steam then passes seal pack 141 and enters into first rotor section 150 again via second inlet flow passage 115. The steam then flows back to second rotor section 158 via passage 127/137 while again cooling rotor 102 as it passes by the high temperature inlet region 104. Such a double cooling route maximizes the use of the cooling flow. Furthermore, there may be a second seal 142 and a third seal 143 located downstream of seal 141. Any steam that may have escaped through seal 142 can be transported back through the inter-shell gap region 132 of steam turbine 100. Further leakage that may occur from seal 143 can be transported through passage 137 in FIG. 2 to a lower pressure turbine 200. For instance, the cooled steam in passage 136/129 in FIG. 2 flows toward an end at rotor section interface 118 in steam turbine 200, then splits into multiple routes to cool the hot area near inlet region 104. The movement of steam from turbine 100 to turbine 200 may improve usage of steam leakages from end-packings which can improve the steam turbine's performance and efficiency and increase the steam turbine and component-parts longevity by allowing them to operate at a reduced temperature throughout rotor 102/101. Moreover, it will avoid expensive external piping and reduce space required in the plant surrounding turbine 100.

Steam turbine 100 according to embodiments of the invention may include rotor 102 that is mounted at its axial ends 101 and 190 in a known manner such that it can rotate around a central rotational axis 103. Additionally, rotor 102 is enclosed within a housing 106 and includes blades 110 that are connected to rotor 102 in a known manner. An opening 104 in inlet manifold 105 allows for steam to enter housing 106 and drive the movement of blades 110. That is, as steam enters inlet manifold 105 it moves into housing 106 and then past blades 110. As the steam moves over blades 110, the steam causes blades 110 to rotate rotor 102. A first inlet flow passage 114 is positioned in rotor 102 that allows already cooled steam to enter passage 136 and flow to the endpacking region 182. First inlet flow passage 114 may be located at any location in rotor 102 depending on desired pressure and temperature for sealing and cooling purposes. First inlet flow passage 114 connects to passage 136.

Figure 2:
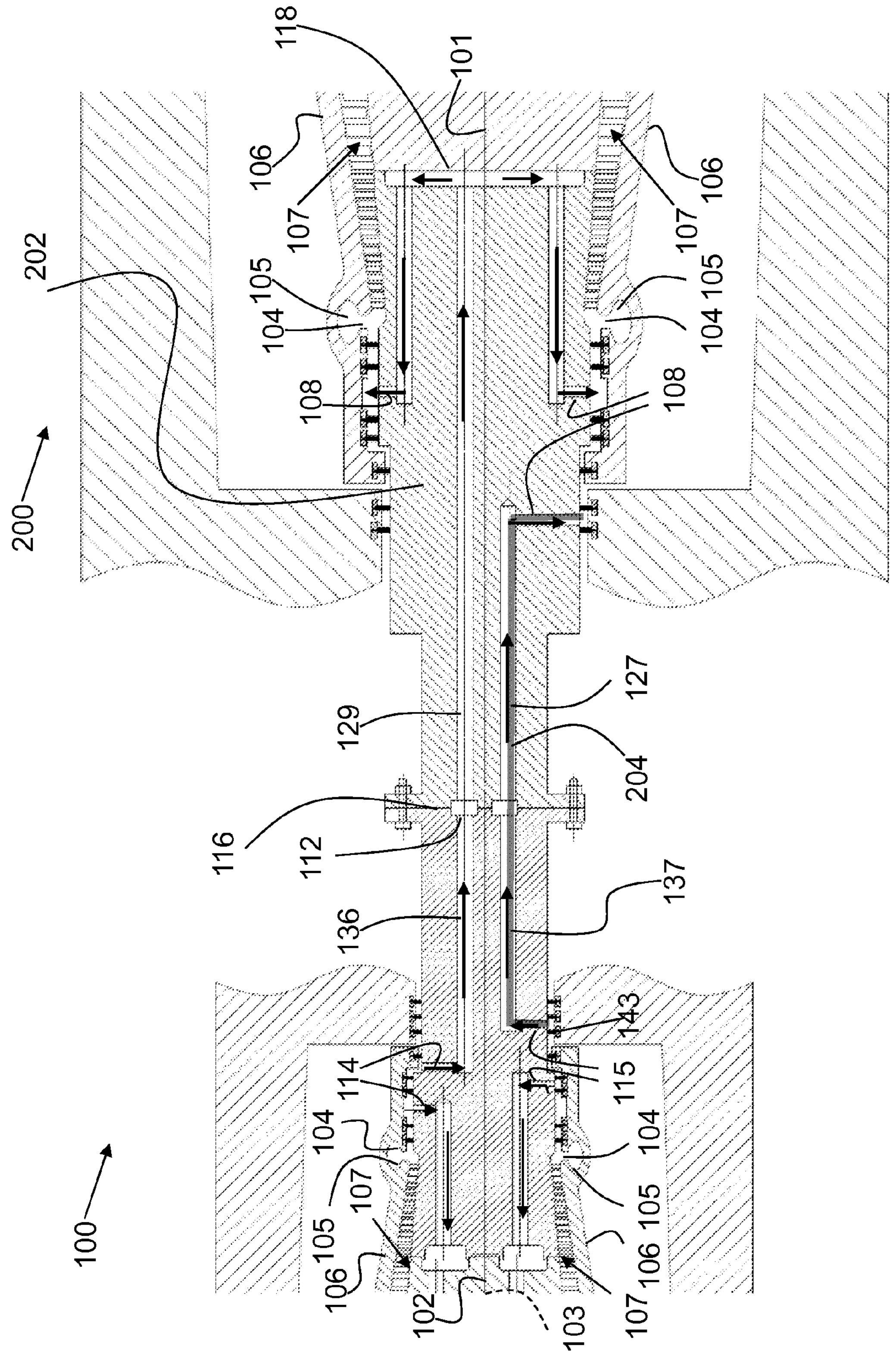
FIG. 2 shows longitudinal sections of adjacent rotors illustrating the movement of steam in passages between the rotors of two steam turbine sections.
Figure 3:
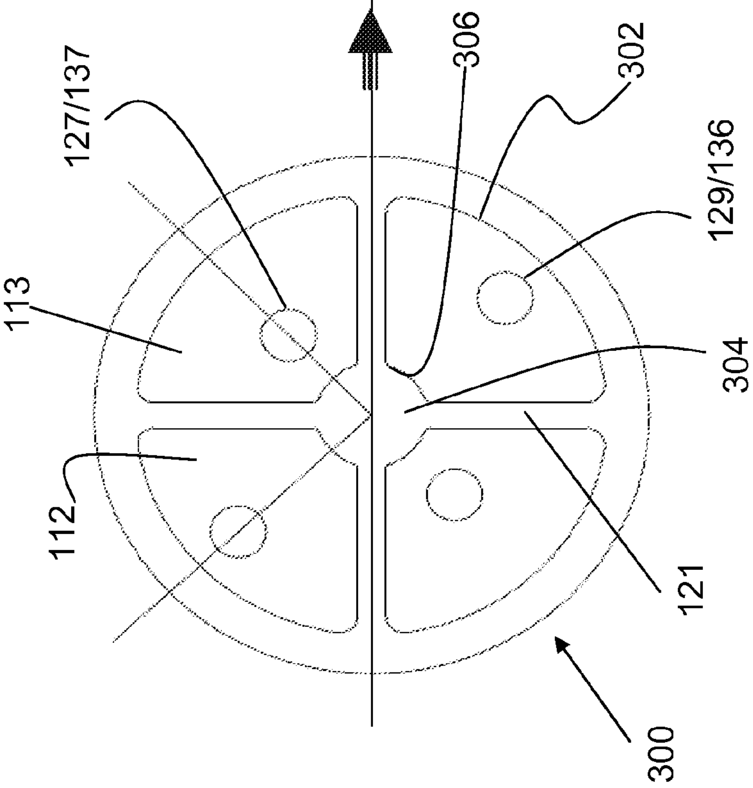
FIGS. 3 and 4 show a cross-section along line A-A in FIG. 1 of an interface of two rotor sections.

Once steam 170 is in passage 136, it may then move to another part of rotor 102 or to a second rotor in another turbine section 200 (FIG. 2) through first outlet flow passage 108. In a further embodiment, there is an alternative way for steam 170 to be transported. That is, from first flow passage 112, steam may be routed back into second flow passage 113 by passing seal 141, through second inlet flow passage 115 and passage 127. From the second flow passage 113, the steam continues flowing to downstream stages and exits through second outlet flow passage 109 which may connect at any location in housing 106, but at a lower pressure location. As discussed herein, steam 170 may be moved from second rotor section 158 to first rotor section 150 to cool the hot section of housing 106 near opening 104, and then flow back from first rotor section 150 to second rotor section 158 within steam turbine 100. To accomplish the movement of steam, passages 129/136 connect to stage space 131 through first 114 inlet flow passage and connect to endpacking area 182 through second outlet flow passage 108. Passages 127/137 connect to stage space 186 through second outlet 109 and connect to endpacking area 184 through second inlet flow passage 115. First inlet flow passage 114 allows steam 170 to move from passages 136 into passage system 300 (FIG. 3). Passage system 300 can include first flow passage 112 or second flow passage 113, or more than two flow passages. Once steam 170 is in passage system 300, it then moves back into housing 106 through first 108 and second outlet flow passage 109. Additionally, steam 170 may be moved from one steam turbine 100 to a second steam turbine 200 (FIG. 2). To accomplish the movement of steam, passages 136 and 137 exist throughout rotor 102 to meet an interface 116 (another passage system shown as mechanical coupled interface in FIG. 2). From interface 116, the steam enters rotor 202 and serves as cooling flow in passage 129 or as steam seal supply via passage 127. The left side of FIG. 2 also illustrates an alternative embodiment in endpacking area of turbine 100 where the internal passages are used as leak-off lines that wind leakages back to turbine flow path.

In one embodiment in FIG. 1, first inlet flow passage 114 opens to a high-pressure region 126 within housing 106 and outlet flow passage 108 is open to an intermediate pressure region 128 or low pressure (i.e., exhaust) region 130. In an alternative embodiment, shown in FIG. 2, first inlet flow passage 114 may be in a region of rotor 102 to collect any rotor end packing leakage. As discussed above, there may be one or more passages (e.g., first flow passage 112, second flow passage 113, third flow passage 123 and fourth passage 124 in (FIG. 4) and each flow passage may have a different length, diameter and steam pressure. As described herein, the movement of steam may be used for any number of purposes. For instance, as described above, steam may be moved through rotor 102 to further cool the rotor. In general, a first flow passage 112, a first inlet flow passage 114 and first outlet flow passage 108 may have a first pressure and each of the second flow passage 113, second inlet flow passage 115 and second outlet flow passage 109 may have a second pressure that is different than the first pressure. To complete the movement of steam, the pressure in first flow passage 112 may be higher than the pressure in second flow passage 113. The temperature, however, may be the opposite. That is, the returning temperature in second flow passage 113 may be higher than the temperature in first flow passage 112. The reason for this may be caused by the return steam having higher enthalpy (i.e., higher temperature) from being heated while cooling the hot inlet region 104.

Steam may also be moved between two steam turbine sections to meet various power demand requirements during peak and off-peak hours. For instance, steam extraction from higher-pressure section (e.g., endpacking region 184) and dumping into lower-pressure turbine section 200 may occur in steam turbine 100 to minimize energy cost. Conventionally, steam extraction and re-entry are accomplished through expensive and space-taking external pipes. As described herein, however, through the use of internal passages and connections, steam transportation can be accomplished utilizing less total steam and lower total cost to operate.

In an alternative embodiment, the movement of steam may also be used to cool steam turbine 100 and/or rotor 102. As the steam expands it cools and may be used to cool various parts of steam turbine 100 and rotor 102. The steam may be moved via first flow passage 112 and second flow passage 113 from a location where the cool steam is located to where cooling is required. In an additional embodiment, seal 141 may include a mechanism 125 to open or close the seal such that the flow resistance varies. As an example, mechanism 125 may be used to regulate the amount of steam 170 entering first flow passage 112 and second flow passage 113. Moreover, mechanism 125 may regulate the amount of steam based on any number of factors. For example, mechanism 125 may regulate steam based on the temperature at various areas within steam turbine 100 allowing mechanism 125 to open for additional cooling flow to pass the hot regions. Alternatively, mechanism 125 could open up a seal to heat/prewarm a relatively cold area to enable a faster startup of a cold or warm steam turbine without adversely impacting longevity of component-parts. When more than one passage is available, multiple mechanisms 125 may be used in selecting which cavity steam 170 enters (including entering multiple passages simultaneously).

First flow passage 112 may be formed in rotor 102 by a welded rotor interface 152/160 (FIG. 1) or by a coupled rotor interface 116 (FIG. 2). Additionally, first flow passage 112 may be partitioned or closed by a radial wall 120. Moreover, a mechanical seal 122 may close or partition first flow passage 112 (FIG. 5).

FIG. 2 shows steam turbine 100 and the movement of steam 170 from rotor 102 to a second rotor 202. Similar to FIG. 1, rotors 102 and 202 include inlet manifold 105 that has opening 104 that allows steam 170 to enter space between shell 106 and rotor surface 107. From the space between blade rows 131, steam 170 may enter first inlet flow passage 114 that is connected to first flow passage 112. From first flow passage 112, steam 170 may be moved to another location within rotor 102 (FIG. 1) or to a second rotor 202 where steam 170 then enters first outlet flow passage 108 and space between blade rows 131. As described throughout, it is anticipated that the movement of steam 170 through first flow passage 112 may apply to the movement of steam to two or more rotors. Additionally, it is anticipated that steam 170 may originate from one or more steam turbines 100 (not shown).

Figure 4:
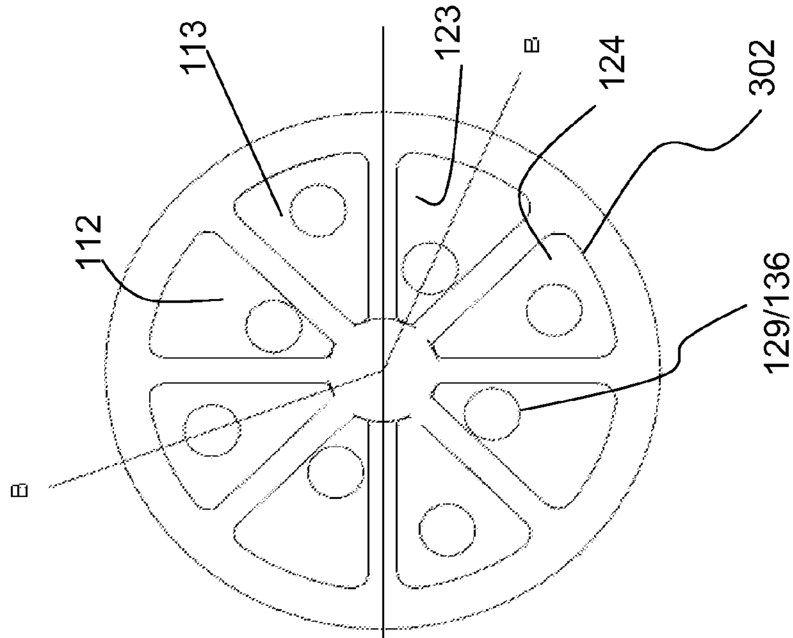

FIG. 3 illustrates one embodiment of passage system 300 including first flow passage 112 and second flow passage 113 enclosed by a wall 302 formed by a radial partition 121 with an inner island 304 and an outer diameter edge 306. Within each first flow passage 112 and second flow passage 113, passage 129/136 may be located at varying locations and have different diameters. Additionally, FIG. 4 shows one embodiment of passage system 300 that includes 8 passages on the rotor end face 152/160. There is a flow passage through each of passages 129/136.

Figure 5:
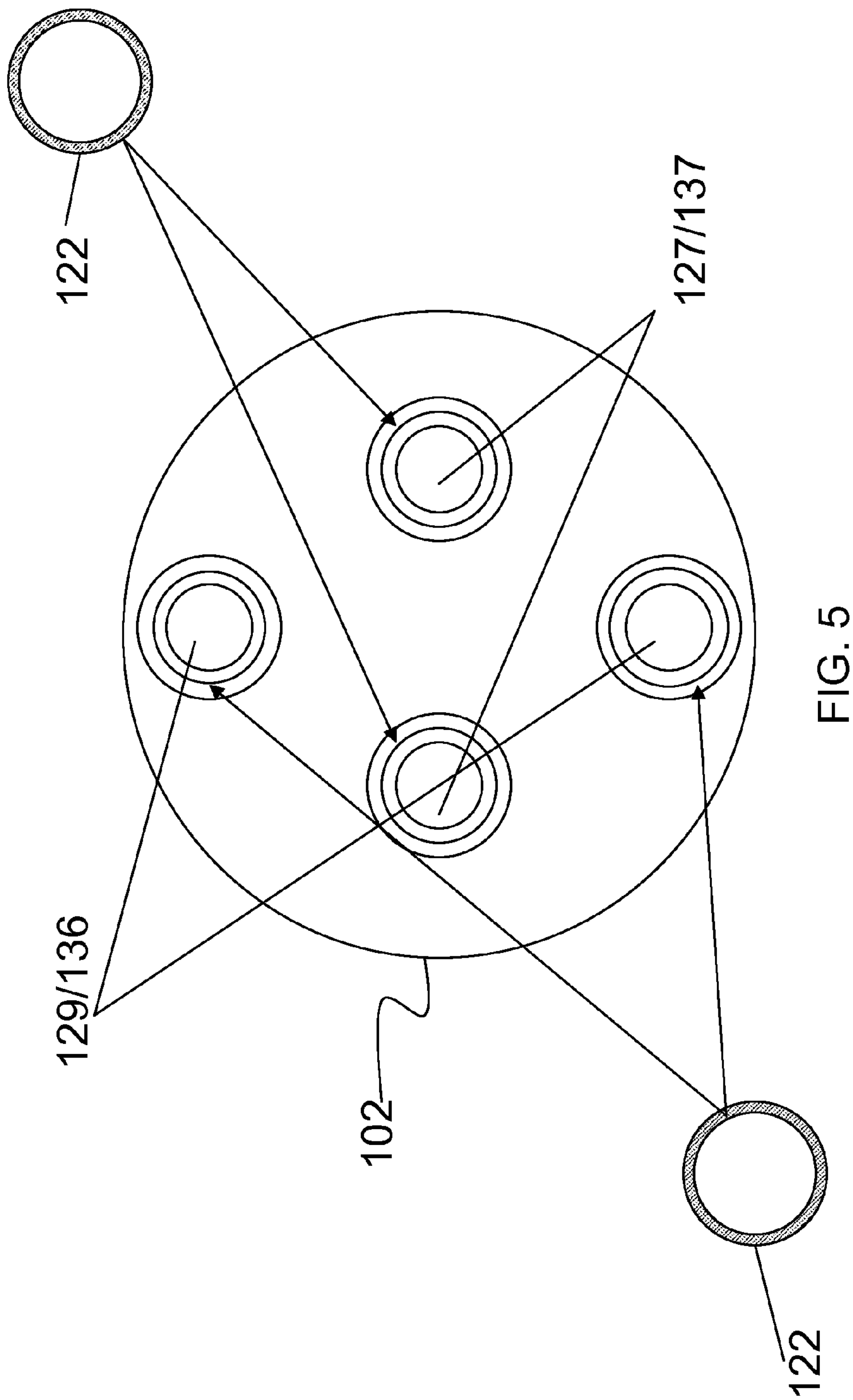
FIG. 5 shows a cross-sectional view of an interface between two rotor sections where seals are used to separate passages to allow for rotor ends to be aligned flush with one another.

FIG. 5 shows an additional embodiment wherein two rotors 102 (FIG. 1) may be welded together. If two rotors 102 are welded together, then one or two sets of seal rings 122 can be put on one end face and keep the other end face free of feature. This allows for the rotor ends to be aligned flush with one another. For the welded embodiment, one of the two sets of seal rings 122 can be removed from rotor 102 without causing leakage between passages or leaking out of the interface.

In addition to a steam turbine, the present disclosure can apply to any machine that includes a rotor. Where a rotor of a machine other than a steam turbine is employed, all aspects of the disclosure described herein will apply to the propellant that is used to operate the machine. The disclosure is intended to apply equally to a steam turbine and to any machine that includes a rotor. As indicated above, aspects of the invention provide improved operation, performance and efficiency of a steam turbine and rotor.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A steam turbine comprising:
- a rotor including: a first rotor section having a first axial end face with a first flow passage and a separate second flow passage;
- a second rotor section having a second axial end face with a first flow passage and a separate second flow passage, the second rotor section disposed axially adjacent and circumferentially rotated to the first rotor section so that the second axial end face faces the first axial end face so that each of the first flow passages in the two rotor sections line up to make a first continuous passage and each of the second flow passages in the two rotor sections line up to make a second continuous passage, wherein the first continuous passage and the second continuous passage are separated at an interface of the two rotor sections, and wherein a flow from the first continuous passage does not interact in the rotor with a flow from the second continuous passage; and
- a passage system formed in the rotor, the passage system including:
  - a first inlet flow passage to an interface, the first inlet flow passage configured to receive steam from a first region of an outer surface of the rotor;
  - a first outlet flow passage from the interface, the first outlet flow passage configured to pass steam to a second region of the rotor;
  - a second inlet flow passage to the interface, the second inlet flow passage configured to receive steam from a third region of the outer surface of the rotor, and
  - a second outlet flow passage from the interface, the second outlet flow passage configured to pass steam to a fourth region of the rotor.

2. The steam turbine of claim 1, wherein the first and second flow passages of at least one of the two rotor sections include a radially extending wall or a mechanical seal to separate the first and second flow passages.

3. The steam turbine of claim 1, wherein the first and second rotor sections are in a same pressure section of the steam turbine.

4. The steam turbine of claim 1, wherein the first and second rotor sections extend between different pressure sections of the steam turbine.

5. The steam turbine of claim 1, wherein the first outlet and second inlet flow passage of at least one of the two rotor sections is in a region of the rotor that is devoid of any blades.

6. The steam turbine of claim 1, wherein each of the first flow passage, the first inlet flow passage, the first outlet flow passage of at least one of the two rotor sections is at a first pressure and each of the second flow passage, the second inlet flow passage, the second outlet flow passage of at least one of the two rotor sections is at a second pressure that is different than the first pressure.

7. The steam turbine of claim 1, further comprising a mechanism that opens or closes a seal to regulate flow to the first and second inlet flow passages.

8. The steam turbine of claim 1, further comprising a high pressure region of steam and a sealing mechanism to seal the high pressure region of steam from leaking out of a steam turbine section.

9. The steam turbine of claim 1, wherein the steam moves through the first and second flow passages of at least one of the two rotor sections to cool the rotor.

10. The steam turbine of claim 1, further comprising a transport cable extending through the first and second flow passages of at least one of the two rotor sections.

11. A rotor comprising:
- a first rotor section having a first axial end face with a first flow passage and a separate second flow passage;
- a second rotor section having a second axial end face with a first flow passage and a separate second flow passage, the second rotor section disposed axially adjacent and circumferentially rotated to the first rotor section so that the second axial end face faces the first axial end face so that each of the first flow passages in the two rotor sections line up to make a first continuous passage and each of the second flow passages in the two rotor sections line up to make a second continuous passage, wherein the first continuous passage and the second continuous passage are separated at an interface of the two rotor sections, and wherein a flow from the first continuous passage does not interact in the rotor with a flow from the second continuous passage; and
- a passage system formed in the rotor, the passage system including:
  - a first inlet flow passage to an interface, the first inlet flow passage configured to receive steam from a first region of an outer surface of the rotor;
  - a first outlet flow passage from the interface, the first outlet flow passage configured to pass steam to a second region of the rotor;
  - a second inlet flow passage to the interface, the second inlet flow passage configured to receive steam from a third region of the outer surface of the rotor, and
- a second outlet flow passage from the interface, the second outlet flow passage configured to pass steam to a fourth region of the rotor.

12. The rotor of claim 11, wherein the first and second flow passages of at least one of the two rotor sections include a radially extending wall or a mechanical seal for separating the first and second flow passages.

13. The rotor of claim 11, wherein the first and second rotor sections are in a same pressure section of a steam turbine.

14. The rotor of claim 11, wherein the first and second rotor sections extend between different pressure sections of a steam turbine.

15. The rotor of claim 11, wherein the first outlet and second inlet flow passage of at least one of the two rotor sections is in a region of the rotor that is devoid of any blades.

16. The rotor of claim 11, wherein each of the first flow passage, the first inlet flow passage, the first outlet flow passage of at least one of the two rotor sections is at a first pressure and each of the second flow passage, the second inlet flow passage, the second outlet flow passage of at least one of the two rotor sections is at a second pressure that is different than the first pressure.

17. The rotor of claim 11, further comprising a mechanism that opens or closes a seal to regulate flow to the first and second inlet flow passages.

18. The rotor of claim 11, further comprising a high pressure region of steam and a sealing mechanism to seal the high pressure region of steam from leaking out of a turbine section.

19. The rotor of claim 11, wherein the steam moves through the first and second flow passages of at least one of the two rotor sections to cool the rotor.

20. The rotor of claim 11, further comprising a transport cable/wire extending through the first and second flow passages of at least one of the two rotor sections.

* * * * *